United States Patent
Whitmarsh et al.

(10) Patent No.: US 7,828,684 B2
(45) Date of Patent: Nov. 9, 2010

(54) CONTROL SYSTEM FOR A DIFFERENTIAL IN A TRANSMISSION

(75) Inventors: Brian W. Whitmarsh, Commerce, MI (US); Todd W. Rooney, Howell, MI (US); Mark A. Vernacchia, Northville, MI (US); Joshua E. Lehrmann, Ann Arbor, MI (US); Wayne B. Vogel, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 516 days.

(21) Appl. No.: 11/950,465

(22) Filed: Dec. 5, 2007

(65) Prior Publication Data

US 2008/0220923 A1 Sep. 11, 2008

Related U.S. Application Data

(60) Provisional application No. 60/893,882, filed on Mar. 8, 2007.

(51) Int. Cl.
*F16H 31/00* (2006.01)
*F16H 48/06* (2006.01)
*B60W 10/02* (2006.01)

(52) U.S. Cl. ......................... 475/120; 475/231; 477/175
(58) Field of Classification Search ................. 475/116, 475/118, 120, 127, 231; 192/3.58; 477/147, 477/175, 180
See application file for complete search history.

(56) References Cited

U.S. PATENT DOCUMENTS

| | | | | |
|---|---|---|---|---|
| 4,679,463 | A | * | 7/1987 | Ozaki et al. .................... 475/86 |
| 7,025,706 | B2 | * | 4/2006 | Katou ........................... 477/45 |
| 7,241,247 | B1 | * | 7/2007 | Hunt et al. .................... 475/231 |
| 7,578,765 | B2 | * | 8/2009 | Tabata et al. ................... 477/5 |
| 2005/0003921 | A1 | * | 1/2005 | Morise et al. ................ 475/116 |
| 2005/0107214 | A1 | * | 5/2005 | Koenig ........................ 477/174 |
| 2008/0216908 | A1 | | 9/2008 | Vernacchia et al. |
| 2008/0220939 | A1 | | 9/2008 | Vernacchia et al. |

* cited by examiner

*Primary Examiner*—Roger Pang

(57) ABSTRACT

A control system for controlling an axle clutch between two half-axles in a motor vehicle is provided. The control system includes two solenoids and a pressure sensor in communication with a controller and a valve assembly. One of the solenoids provides a flow of fluid to engage the axle clutch. The valve assembly cooperates with another of the solenoids to disengage the axle clutch under certain conditions.

19 Claims, 3 Drawing Sheets

CONTROL SYSTEM FOR A DIFFERENTIAL IN A TRANSMISSION

CROSS-REFERENCE TO RELATED APPLICATIONS

This application claims the benefit of U.S. Provisional Application No. 60/893,882, filed on Mar. 8, 2007. The disclosure of the above application is incorporated herein by reference.

FIELD

The invention relates generally to a control system in a transmission, and more particularly to a control system for a differential in a transmission.

BACKGROUND

The statements in this section merely provide background information related to the present disclosure and may or may not constitute prior art.

A typical motor vehicle includes a differential assembly that is coupled to a pair of half-axles each supporting a wheel of the motor vehicle. The differential assembly can include a clutch that is employed to control the relative rotational speeds of the half-axles, also known as "slip", in order to maximize performance and safety on different road surface conditions.

The differential slip clutch is typically controlled using a bolt on control system that is separate from the control system of the transmission of the motor vehicle. This add-on control system for controlling the differential slip clutch can increase weight, packaging size, and manufacturing costs. Accordingly, there is a need in the art for a control system for a differential assembly that is integrated with the transmission controls in order to reduce weight, packaging size, and cost while providing accurate and responsive control of the differential assembly.

SUMMARY

The present invention provides a control system for controlling an axle clutch between two half-axles in a motor vehicle. The control system includes two solenoids, a pressure sensor, a controller, and a valve assembly. The valve assembly cooperates with one of the solenoids to disengage the axle clutch.

One embodiment of the control system of the present invention includes a controller for providing a first control signal, a second control signal, and a third control signal, a first solenoid in communication with the controller and having a first port for receiving a first fluid flow and a second port in communication with the first port for selectively receiving the first fluid flow, a second solenoid in communication with the controller and having a first port for receiving a second fluid flow and a second port in communication with the first port for selectively receiving a third fluid flow, the second solenoid operable to vary the third fluid flow according to the third control signal, and a valve assembly having a valve movably disposed within a valve body, the valve body having a first inlet port in communication with the second port of the first solenoid, a second inlet port in communication with the second port of the second solenoid, and an outlet port in communication with the second inlet port for selectively receiving the third fluid flow. The first control signal activates the first solenoid to open such that the second port of the first solenoid receives the first fluid flow and communicates the first fluid flow to the first inlet port of the valve assembly to move the valve to a first position, and wherein the second control signal activates the first solenoid to close such that the second port of the first solenoid does not receive the first fluid flow and the valve assembly moves to a second position. The first position of the valve directs the third fluid flow to the outlet port to engage the axle clutch and wherein the second position of the valve prevents the third fluid flow from communicating with the outlet port to disengage the axle clutch.

In one aspect of the present invention, the control system further includes a pressure sensor in communication with the controller and in communication with the outlet port of the valve assembly, the pressure sensor operable to detect a pressure of the third fluid flow and to communicate a pressure signal to the controller indicative of the pressure of the third fluid flow.

In another aspect of the present invention, the controller sends the second control signal to disengage the axle clutch when the pressure signal indicates that the pressure of the third fluid flow exceeds a threshold.

In yet another aspect of the present invention, the threshold is approximately equal to a pressure of the second fluid flow.

In yet another aspect of the present invention, the controller sends the second control signal to disengage the axle clutch when the pressure signal indicates that the pressure of the third fluid flow is not equal to an expected pressure.

In yet another aspect of the present invention, the expected pressure is equal to a pressure indicated by the third control signal and communicated to the second solenoid.

In yet another aspect of the present invention, the control system further includes a wheel speed sensor in communication with the controller and operable to detect a speed of a wheel coupled to the axle clutch and to communicate a speed signal to the controller indicative of the speed of the wheel.

In yet another aspect of the present invention, the controller varies a pressure of the third fluid flow to control the axle clutch according to the speed signal communicated from the wheel speed sensor.

In yet another aspect of the present invention, the first solenoid is an on/off normally low solenoid.

In yet another aspect of the present invention, the second solenoid is a normally low variable force solenoid.

In another embodiment of the present invention the control system includes a controller for providing a first control signal, a second control signal, and a third control signal, a first solenoid in communication with the controller and having a first port for receiving a first fluid flow and a second port in communication with the first port for selectively receiving the first fluid flow, a second solenoid in communication with the controller and having a first port for receiving a second fluid flow and a second port in communication with the first port for selectively receiving a third fluid flow, the second solenoid operable to vary the third fluid flow according to the third control signal, a valve assembly having a valve movably disposed within a valve body, the valve body having a first inlet port in communication with the second port of the first solenoid, a second inlet port in communication with second port of the second solenoid, and an outlet port in communication with the second inlet port for selectively receiving the third fluid flow, and a pressure sensor in communication with the controller and in communication with the outlet port of the valve assembly, the pressure sensor operable to detect a pressure of the third fluid flow and to communicate a pressure signal to the controller indicative of the pressure of the third fluid flow. The first control signal activates the first solenoid to open such that the second port of the first solenoid receives the first fluid flow and communicates the first fluid flow to the first inlet port of the valve assembly to move the valve to a first position, and wherein the second control signal activates the first solenoid to close such that the second port of the first solenoid does not receive the first fluid flow and the valve assembly moves to a second position. The first position of the valve directs the third fluid flow to the outlet port to engage the axle clutch and wherein the second position of the valve prevents the third fluid flow from communicating with the outlet port to disengage the axle clutch.

In one aspect of the present invention, the second control signal is communicated to the first solenoid when the pressure signal indicates the pressure of the third fluid flow exceeds a threshold.

In another aspect of the present invention, the threshold is approximately equal to a pressure of the second fluid flow.

In yet another aspect of the present invention, the threshold is approximately equal to a pressure indicated by the third control signal and communicated to the second solenoid.

In yet another aspect of the present invention, the control system further includes a wheel speed sensor in communication with the controller and operable to detect a speed of a wheel coupled to the axle clutch and to communicate a speed signal to the controller indicative of the speed of the wheel.

In yet another aspect of the present invention, the controller varies a pressure of the third fluid flow to control the axle clutch according to the speed signal communicated from the wheel speed sensor.

In yet another aspect of the present invention, the first solenoid is an on/off normally low solenoid.

In yet another aspect of the present invention, the second solenoid is a normally low variable force solenoid.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
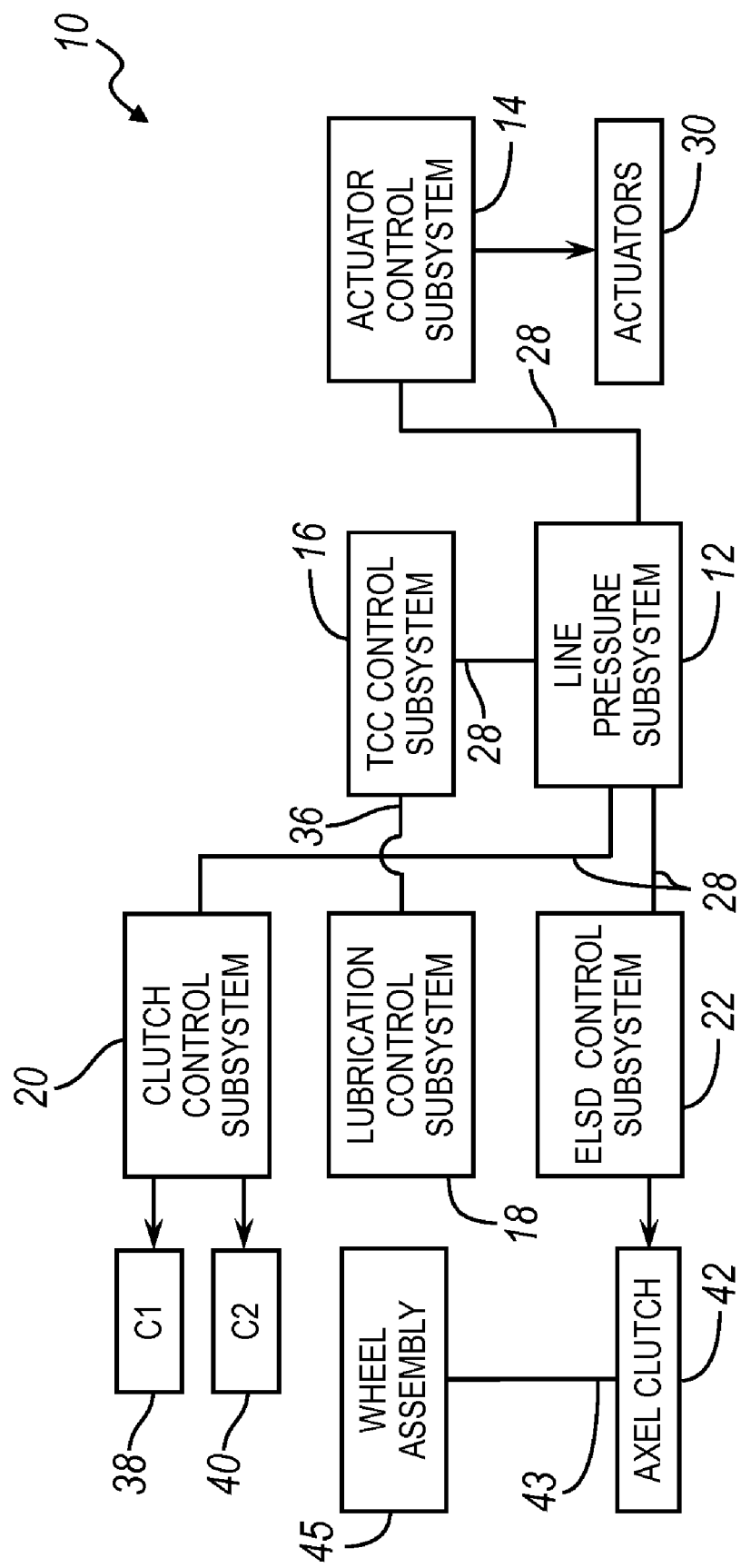
FIG. 1 is a schematic diagram of an embodiment of a hydraulic control system for a dual clutch transmission having an electronic limited slip differential subsystem according to the principles of the present invention.

With reference to FIG. 1, a hydraulic control system for use in a dual clutch transmission in a motor vehicle is illustrated schematically and generally indicated by reference number 10. While in the example provided the hydraulic control system 10 is employed in a dual clutch transmission, various other transmission types may be employed without departing from the scope of the present invention. The hydraulic control system 10 includes a plurality of subsystems including a line pressure subsystem 12, an actuator control subsystem 14, a torque converter clutch (TCC) control subsystem 16, a lubrication control subsystem 18, a clutch control subsystem 20, and an electronic limited slip differential (ELSD) subsystem 22.

The line pressure subsystem 12 is operable to provide and regulate pressurized hydraulic fluid, such as oil, throughout the hydraulic control system 10. Accordingly, the line pressure subsystem 12 may include various components (not shown) such as a hydraulic pump, a hydraulic fluid source, a line pressure blow-off valve, a line pressure regulator valve, and/or filter. In the example provided, the line pressure subsystem 12 includes a fluid communication channel or line passage, indicated by reference number 28, which directly provides pressurized hydraulic fluid to the actuator control subsystem 14, the TCC control subsystem 16, the clutch control subsystem 20, and the ELSD control subsystem 22. The line passage 28 is illustrated schematically in FIG. 1 as a plurality of separate lines, however it should be appreciated that the line passage 28 may be a single continuous passage or series of linked passages without departing from the scope of the present invention.

The actuator control subsystem 14 controls the actuation of a plurality of actuators 30 such as synchronizers, clutches, and/or brakes. The actuators 30 are operable to selectively engage a plurality of gear sets (not shown) within the transmission to provide a plurality of forward and reverse speed ratios and a neutral. Accordingly, the actuator control subsystem 14 may include various components (not shown) such as solenoids, valves, and three area piston assemblies employed to actuate or control the actuators 30.

The TCC control subsystem 16 controls the operation of a torque converter (not shown) in the transmission. The TCC control subsystem 16 is in direct hydraulic communication with the lubrication control subsystem 18 through a fluid passage 36. The fluid passage 36 may be a single channel or a plurality of linked channels in series or parallel without departing from the scope of the present invention.

The lubrication control subsystem 18 provides lubrication and cooling to a variety of components throughout the transmission. For example, the lubrication control subsystem 18 may direct hydraulic fluid through a plurality of fluid passages (not shown) to components that generate heat.

The clutch control subsystem 20 is operable to control a dual clutch assembly that includes a first clutch 38 and a second clutch 40. The clutches 38, 40 may be used to engage one or more countershafts (not shown) within the dual clutch transmission and provide dynamic or "power-on" shifts by alternating engagement between the clutches 38, 40.

The ELSD subsystem 22 is operable to control an axle clutch 42 located in a differential gear box (not shown) of the motor vehicle. The axle clutch 42 is coupled to a pair of half-axles 43 which in turn are coupled to a pair of wheel assemblies 45. The axle clutch 42 controls the difference in speed between the pair of half-axles 43 and wheel assemblies 45 in order to eliminate the difference (or "slip") between the half axles 43 and wheel assemblies 45, as will be described in further detail below.

Figure 2:
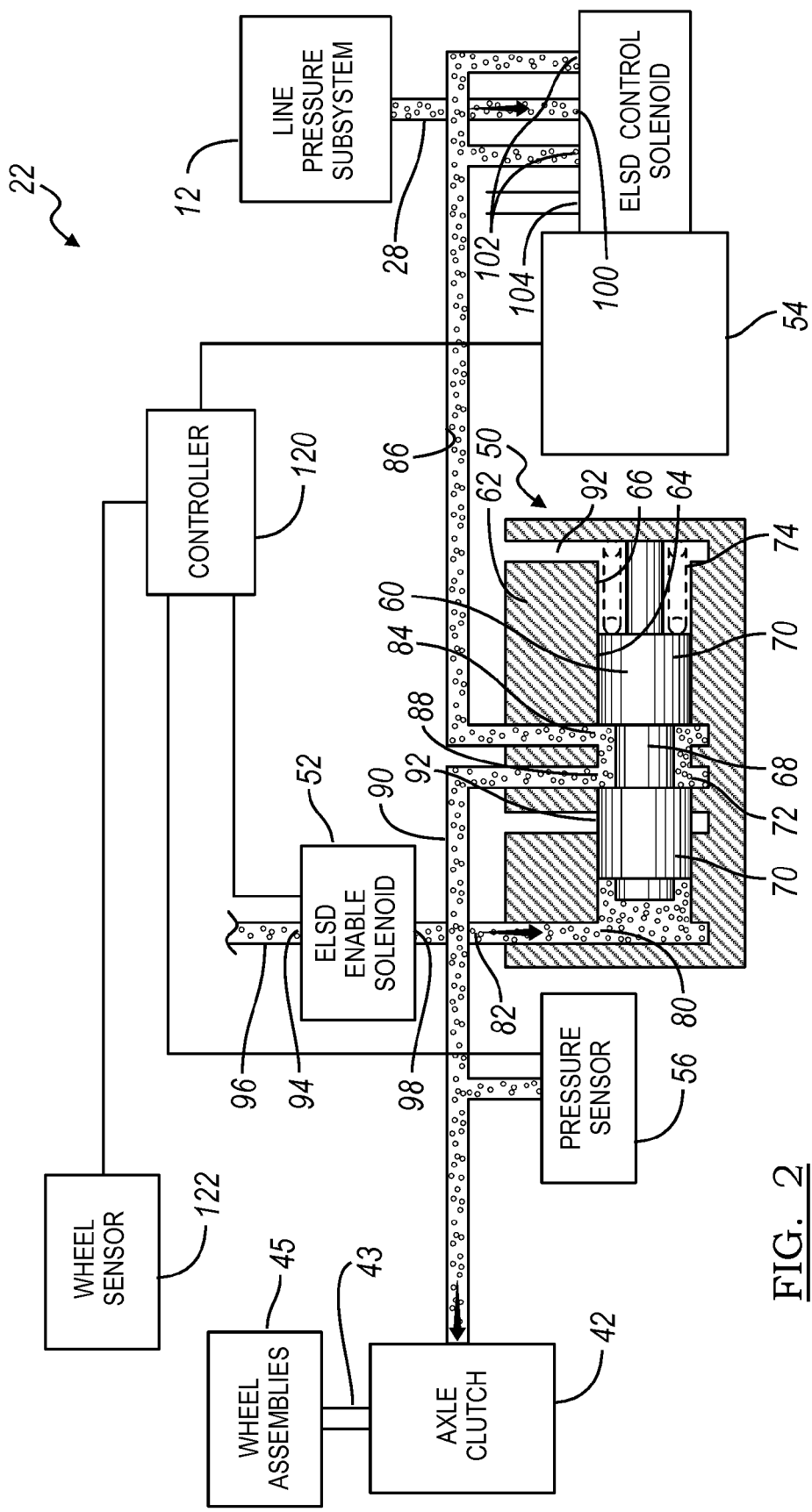
FIG. 2 is a diagrammatic view of an embodiment of the electronic limited slip differential subsystem according to the present invention in an engaged mode.
Figure 3:
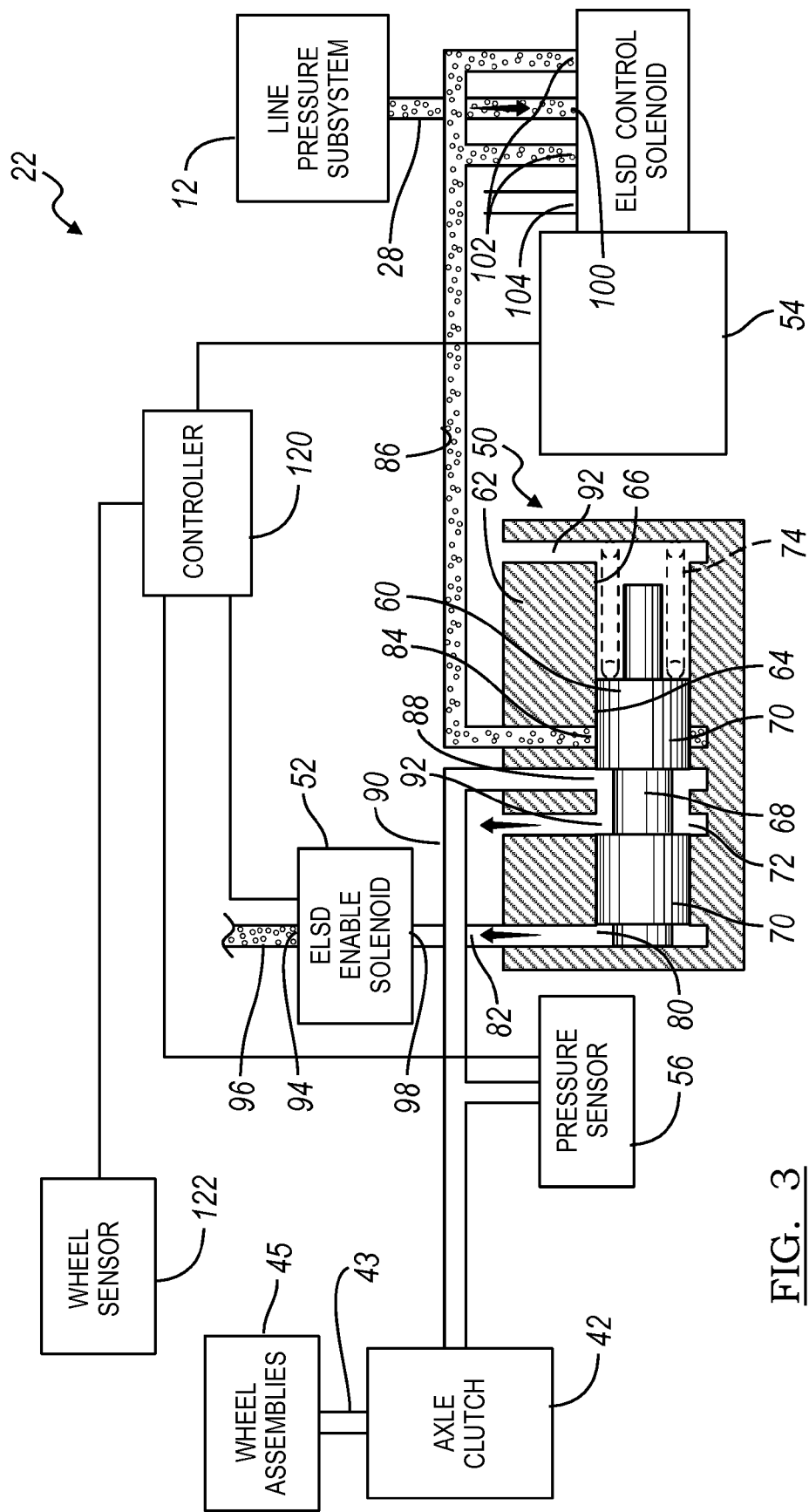
FIG. 3 is a diagrammatic view of an embodiment of the electronic limited slip differential subsystem according to the present invention in a disengaged mode.

Turning to FIG. 2, the ELSD subsystem 22 will now be described in further detail. The ELSD subsystem 22 generally includes a valve assembly 50, a first solenoid 52, a second solenoid 54, and a pressure sensor 56 that all cooperate to control the axle clutch 42. The valve assembly 50 includes a valve 60 located within a valve body 62. More specifically, the valve body 62 includes a bore 64 that defines a valve chamber 66 and the valve 60 is slidably supported within the valve chamber 66. The valve body 62 is preferably formed as an integral component of the transmission. The valve 60 includes a central body 68 that extends along a length of the valve chamber 66. A plurality of lands 70 extend from the central body 68 and engage the bore 64 of the valve chamber 66. The lands 70 are spaced at opposite ends of the central body 68 and cooperate with the bore 64 of the valve chamber 66 to define a fluid chamber 72 between the lands 70. The valve 60 is moveable within the valve chamber 66 between a first position, as illustrated in FIG. 2, and a second position, as illustrated in FIG. 3. A biasing member 74, such as a spring, is located within the valve chamber 66 between an end of the valve 60 and the bore 64. The biasing member 74 biases the valve 60 to the second position.

The valve body 62 further defines a plurality of ports that connect with a plurality of fluid communication channels or passages. In the example provided, the valve body 62 includes a first inlet port 80 that communicates with the valve chamber 66 at an end of the valve 60 opposite the end of the valve 60 engaged by the biasing member 74. The first inlet port 80 communicates with a first fluid communication channel 82. A second inlet port 84 communicates with the valve chamber 66 between the first inlet port 80 and the end of the valve 60 engaged by the biasing member 74. The second inlet port 84 communicates with a second fluid communication channel 86. An outlet port 88 communicates with the valve chamber 66 between the first inlet port 80 and the second inlet port 84. The outlet port 88 communicates with a third fluid communication channel 90. The third fluid communication channel 90 is in fluid communication with the axle clutch 42. Finally, a plurality of exhaust channels 92 communicate with the valve chamber 66 at various locations along the length of the valve chamber 66. It should be appreciated that various other arrangements of fluid communication channels and ports may be employed without departing from the scope of the present invention.

The first solenoid 52, or ELSD enable solenoid, is employed to enable activation of the axle clutch 42, as will be described in further detail below. The first solenoid 52 generally includes a first fluid port 94 in fluid communication with a pressure regulated line channel 96. The pressure regulated line channel 96 delivers a first flow of pressurized hydraulic fluid from the line pressure subsystem 12 (FIG. 1) to the first solenoid 52. The first solenoid 52 further includes a second fluid port 98 in fluid communication with the first fluid communication channel 82. The first solenoid 52 is operable to selectively open to allow the first fluid flow from the pressure regulated line channel 96 to pass from the first fluid port 94 through the first solenoid 52 to the second fluid port 98 and to enter the first fluid communication channel 82. The first solenoid 52 is preferably an on/off solenoid that either fully opens or closes and that is normally low or closed when not energized by a power source.

The second solenoid 54, or ELSD control solenoid, is employed to control the operation of the axle clutch 42 using a pressurized flow of hydraulic fluid, as will be described in further detail below. The second solenoid 54 generally includes an inlet port 100 in fluid communication with the line channel 28. As described in FIG. 1, the line channel 28 is in communication with the line pressure subsystem 12 and provides a second flow of pressurized hydraulic fluid to the inlet port 100. The second solenoid 54 further includes at least one outlet port 102 in fluid communication with the second fluid communication channel 84. It should be appreciated that more than one outlet port 102 may be provided without departing from the scope of the present invention. The second solenoid 54 also includes an exhaust port 104 for venting the second communication channel 86 through the second solenoid 54 when required. The second solenoid 54 is operable to variably open to receive the second fluid flow from the line channel 28 and to provide a variable third fluid flow to the outlet port 102 and to the second fluid communication channel 86. Accordingly, the second solenoid 54 is preferably a high-flow variable force solenoid that regulates the pressure of the hydraulic fluid from the outlet port 102. Additionally, the second solenoid 54 is preferably normally low or closed when not energized by a power source.

The pressure sensor 56 is in fluid communication with the third fluid communication channel 90 between the valve assembly 50 and the axle clutch 42. The pressure sensor 56 is operable to sense or detect the pressure of the third fluid flow in the third fluid communication channel 90. Accordingly, the pressure sensor 56 is operable to provide a pressure signal indicative of the pressure of the third fluid flow. The pressure sensor 56 may take various forms, for example a pressure transducer, without departing from the scope of the present invention.

A controller 120 is in electronic communication with various components of the hydraulic control system 10 including the first solenoids 52, the second solenoid 54, and the pressure sensor 56. The controller 120 may be an integrated transmission control module, an engine control module, or a separate add on control module that is preferably an electronic device having a preprogrammed digital computer or processor, control logic, memory used to store data, and at least one I/O peripheral. The control logic includes a plurality of logic routines for monitoring, manipulating, and generating data. However, various other types of controllers may be employed without departing from the scope of the present invention. The controller 120 receives wheel speed or input signals from a plurality of wheel speed sensors 122. The wheel speed sensors 122 are preferably coupled to the motor vehicle proximate to the half-axles 43 or the wheel assemblies 45 and are operable to detect the rotational speed, or torque, of the half-axles 43 or the wheel assemblies 45. Accordingly, the input signals sent from the wheel speed sensors 122 to the controller 120 are indicative of the speed of the half-axles 43 controlled by the axle clutch 42. The controller 120 also receives a plurality of additional signals regarding the current condition of the vehicle as well as the intention of the driver operating the vehicle. For example, the signals regarding the vehicle state may include wheel speed data from sensors from all four wheels to determine absolute speed and relative speeds between the wheels, a yaw signal from a yaw sensor to detect the rate of rotation of vehicle about a vertical axis (i.e., yaw rate in degrees/sec), a lateral acceleration signal, a longitudinal acceleration signal, and/or an engine torque signal. The signals regarding the driver's intentions may include the steering wheel angle and/or the accelerator pedal position. The controller 120 contains control logic or software and control algorithms to compare the current state of the vehicle with the driver intentions and will apply the axle clutch 42 accordingly for the most advantageous vehicle dynamic results. Additionally, the controller 120 can receive a direct command from a vehicle supervisor controller, or electronic brake control module (eBCM), to pressurize to a specific, commanded value. To control the axle clutch 42, the controller 120 electronically communicates with the hydraulic control system 10, including the solenoids 52 and 54, using a plurality of control signals to initiate the desired operation of the axle clutch 42 according to the input signals communicated from the wheel speed sensors 122.

For example, FIG. 2 illustrates the ELSD subsystem 22 in a normal operating condition wherein the axle clutch 42 is selectively controlled by the controller 120 during operation of the motor vehicle. In this condition, the controller 120 signals the first solenoid 52 to remain open using a control signal, and the first fluid flow passes from the pressure regulated line channel 96, through the first solenoid 52, and into the valve chamber 66 of the valve assembly 50. The first fluid flow engages the valve 60 and positions the valve 60 into the first position against the bias of the biasing member 74. When the valve 60 is in the first position, the fluid chamber 72 communicates with both the second inlet port 84 and the outlet port 88. Meanwhile, the second fluid flow from the line channel 28 enters the second solenoid 54. The second solenoid 54 variably controls the amount of fluid flow therethrough according to the control signals from the controller 120 based on the desired operation of the axle clutch 42. Accordingly, the third fluid flow exits the second solenoid 54 through the outlet port 102 and enters the second fluid communication passage 86. The variable third fluid flow communicates through the second fluid communication passage 86, through the fluid chamber 72, and enters the third fluid passage 90. The variable third fluid flow is carried to the axle clutch 42 by the third communication fluid passage 90 and engages and activates the axle clutch 42. The controller 120 monitors the pressure of the third fluid flow in the third fluid communication passage 90 through the pressure sensor 56, and adjusts the pressure of the third fluid flow, and therefore the amount of engagement of the axle clutch 42, according to the wheel speed data collected from the wheel sensors 122 and the pressure signals indicative of the pressure of the third fluid flow.

The ELSD control system 22 is operable to disengage the axle clutch 42 under certain conditions. For example, the controller 120 receives the pressure signal from the pressure sensor 56 and compares the pressure signal to a threshold. The threshold may be any predetermined value indicative of over-pressurization of the third fluid flow and therefore over-engagement of the axle clutch 42. One example of a threshold value is the pressure value of the second fluid flow. Alternatively, the controller 120 may compare the pressure signal to an expected pressure value. The expected pressure value is indicative of the expected pressure of the third fluid flow from the second solenoid 54 based on the control signal communicated from the controller 120 to the second solenoid 54. In any condition where the controller 120 determines that the axle clutch 42 is to be disengaged, the controller 120 signals for the first solenoid 52 to close such that the first fluid flow is not received by the second port 98 and does not engage the valve 60. Accordingly, as the first fluid flow is cut off from the valve assembly 50, the valve is positioned into the second position by the biasing member 74, as illustrated in FIG. 3. In the second position, the fluid chamber 72 communicates with the outlet port 88 and an exhaust channel 92 and one of the plurality of lands 70 closes off the inlet port 84. Accordingly, the third fluid flow is prevented from engaging the axle clutch 42 and any pressurized fluid present in the third fluid communication channel 90 vents through the exhaust channel 92, thereby disengaging or releasing the axle clutch 42.

The description of the invention is merely exemplary in nature and variations that do not depart from the gist of the invention are intended to be within the scope of the invention. Such variations are not to be regarded as a departure from the spirit and scope of the invention.

The invention claimed is:

1. A control system for controlling an axle clutch, the control system comprising:
    a controller for providing a first control signal, a second control signal, and a third control signal;
    a first solenoid in communication with the controller and having a first port for receiving a first fluid flow and a second port in communication with the first port for selectively receiving the first fluid flow;
    a second solenoid in communication with the controller and having a first port for receiving a second fluid flow and a second port in communication with the first port for selectively receiving a third fluid flow, the second solenoid operable to vary the third fluid flow according to the third control signal; and
    a valve assembly having a valve movably disposed within a valve body, the valve body having a first inlet port in communication with the second port of the first solenoid, a second inlet port in communication with second port of the second solenoid, and an outlet port in communication with the second inlet port for selectively receiving the third fluid flow;
    wherein the first control signal activates the first solenoid to open such that the second port of the first solenoid receives the first fluid flow and communicates the first fluid flow to the first inlet port of the valve assembly to move the valve to a first position, and wherein the second control signal activates the first solenoid to close such that the second port of the first solenoid does not receive the first fluid flow and the valve assembly moves to a second position; and
    wherein the first position of the valve directs the third fluid flow to the outlet port to engage the axle clutch and wherein the second position of the valve prevents the third fluid flow from communicating with the outlet port to disengage the axle clutch.

2. The control system of claim 1 further comprising a pressure sensor in communication with the controller and in communication with the outlet port of the valve assembly, the pressure sensor operable to detect a pressure of the third fluid flow and to communicate a pressure signal to the controller indicative of the pressure of the third fluid flow.

3. The control system of claim 2 wherein the controller sends the second control signal to disengage the axle clutch when the pressure signal indicates that the pressure of the third fluid flow exceeds a threshold.

4. The control system of claim 3 wherein the threshold is approximately equal to a pressure of the second fluid flow.

5. The control system of claim 2 wherein the controller sends the second control signal to disengage the axle clutch when the pressure signal indicates that the pressure of the third fluid flow is not equal to an expected pressure.

6. The control system of claim 5 wherein the expected pressure is equal to a pressure indicated by the third control signal and communicated to the second solenoid.

7. The control system of claim 1 further comprising a wheel speed sensor in communication with the controller and operable to detect a speed of a wheel coupled to the axle clutch and to communicate a speed signal to the controller indicative of the speed of the wheel.

8. The control system of claim 7 wherein the controller varies a pressure of the third fluid flow to control the axle clutch according to the speed signal communicated from the wheel speed sensor.

9. The control system of claim 1 wherein the first solenoid is an on/off normally low solenoid.

10. The control system of claim 8 wherein the second solenoid is a normally low variable force solenoid.

11. The control system of claim 1 wherein the valve is positioned into the second position by a biasing member disposed within the valve body.

12. A control system in a transmission for controlling an axle clutch in a differential assembly, the control system comprising:

a controller for providing a first control signal, a second control signal, and a third control signal;

a first solenoid in communication with the controller and having a first port for receiving a first fluid flow and a second port in communication with the first port for selectively receiving the first fluid flow;

a second solenoid in communication with the controller and having a first port for receiving a second fluid flow and a second port in communication with the first port for selectively receiving a third fluid flow, the second solenoid operable to vary the third fluid flow according to the third control signal;

a valve assembly having a valve movably disposed within a valve body, the valve body having a first inlet port in communication with the second port of the first solenoid, a second inlet port in communication with second port of the second solenoid, and an outlet port in communication with the second inlet port for selectively receiving the third fluid flow; and a pressure sensor in communication with the controller and in communication with the outlet port of the valve assembly, the pressure sensor operable to detect a pressure of the third fluid flow and to communicate a pressure signal to the controller indicative of the pressure of the third fluid flow;

wherein the first control signal activates the first solenoid to open such that the second port of the first solenoid receives the first fluid flow and communicates the first fluid flow to the first inlet port of the valve assembly to move the valve to a first position, and wherein the second control signal activates the first solenoid to close such that the second port of the first solenoid does not receive the first fluid flow and the valve assembly moves to a second position; and wherein the first position of the valve directs the third fluid flow to the outlet port to engage the axle clutch and wherein the second position of the valve prevents the third fluid flow from communicating with the outlet port to disengage the axle clutch;

wherein the controller communicates the second control signal to the first solenoid when the pressure signal indicates the pressure of the third fluid flow exceeds a threshold.

13. The control system of claim 12 wherein the threshold is approximately equal to a pressure of the second fluid flow.

14. The control system of claim 12 wherein the threshold is approximately equal to a pressure indicated by the third control signal and communicated to the second solenoid.

15. The control system of claim 12 further comprising a wheel speed sensor in communication with the controller and operable to detect a speed of a wheel coupled to the axle clutch and to communicate a speed signal to the controller indicative of the speed of the wheel.

16. The control system of claim 15 wherein the controller varies a pressure of the third fluid flow to control the axle clutch according to the speed signal communicated from the wheel speed sensor.

17. The control system of claim 16 wherein the first solenoid is an on/off normally low solenoid.

18. The control system of claim 17 wherein the second solenoid is a normally low variable force solenoid.

19. The control system of claim 18 wherein the valve is positioned into the second position by a biasing member disposed within the valve body.

* * * * *